A3,676,192
CROSSLINKED POLYVINYL CHLORIDE OR
POLYVINYLIDENE FLUORIDE FILM
Ernest A. Hahn, Pittsburgh, Pa., assignor to
PPG Industries, Inc., Pittsburgh, Pa.
No Drawing. Filed Apr. 6, 1970, Ser. No. 26,086
Int. Cl. B44d 1/50; C08f 1/24
U.S. Cl. 117—93.31                22 Claims

ABSTRACT OF THE DISCLOSURE

Coating compositions comprising polyvinyl chloride or polyvinylidene fluoride are prepared by mixing a solution of the polyvinyl chloride or polyvinylidene fluoride in an active solvent with an acrylic monomer and subjecting the mixture to ionizing irradiation. The cured films are hard, stain-resistant, heat-resistant, and mar-resistant.

---

Polymers of vinyl chloride and vinylidene fluoride have been used extensively in coating compositions and the coatings possess outstanding durability and flexibility. Generally, however, the films are difficult and expensive to apply and, as they are thermoplastic, lack the strength of some of the crosslinked films formed from thermosetting resins.

The polyvinyl chloride or polyvinylidene fluoride films are generally applied as coatings or formed into films by either forming a plastisol of the material with a plasticizer and subjecting the polymer to high temperatures or by forming an organisol. The organisol is formed by adding an active solvent for the polyvinyl chloride or polyvinylidene fluoride. As application viscosities are necessarily low, an abundance of solvents must be used to cut down the solids content. Also, as active solvents with respect to the polyvinylidene fluoride and polyvinyl chloride are quite expensive, solvents which are not active with respect to the polymers, but which are less expensive, are generally added to the solution to cut down the solids content. The organisol, then, is originally a dispersion of polymer in active and non-active solvent. The non-active solvent has a lower boiling point than the active solvent so that the dispersion is applied to a substrate, flashed to a temperature higher than the non-active solvent boiling point and lower than that of the active solvent, thus forming an organisol of polymer in active solvent on the substrate to be coated. This application process requires a baking oven and a great deal of solvents. The plastisol requires a plasticizer and the use of very high temperatures. Thus, both of these processes are expensive and result in thermoplastic films and coatings which are not crosslinked.

It has now been discovered that outstanding films and coating compositions are obtained by combining solutions of polyvinyl chloride or polyvinylidene fluoride in active solvents with certain acrylic monomers. The coating compositions may then be subjected to ionizing irradiation to form thermosetting crosslinked coatings and films. Coatings formed from the compositions of this invention possess excellent appearance, impact-resistance, mar-resistance, stain-resistance, and are flexible.

The uses of the composition are many and varied due to the numerous excellent qualities of the resulting coatings. For example, they can be used as interior coatings for drums, pipes, and the like, as well as exterior finishes on metal surfaces such as aluminum or galvanized steel siding. They can also be used as table top coatings, refrigerator interior coatings and as coatings for many other articles.

The composition used to form the coating comprises (a) a solution of a polymer of vinyl chloride or vinylidene fluoride in a solvent for the polymer, and (b) a specific type of acrylic monomer.

The polymer used may be either polyvinylidene fluoride or polyvinyl chloride. The polyvinylidene fluoride is a polymer containing at least about 90 percent by weight of vinylidene fluoride moiety, and preferably will be the homopolymer of vinylidene fluoride. Useful copolymers will include those where the minor constituent is a fluorinated co-monomer as, for example, tetrafluoroethylene, hexafluoropropylene, chlorotrifluoroethylene, vinyl fluoride, and the like. Such copolymer compositions are well known in the art and may be prepared by any of the conventional methods as, for example, those techniques disclosed in U.S. Pats. 2,435,537 and 3,031,437.

The polyvinyl chloride is a polymer containing at least about 90 percent by weight of polyvinyl chloride and preferably is the homopolymer of vinyl chloride. Suitable copolymers will include vinyl chloride-vinyl acetate, vinyl chloride-vinylidene chloride and the like.

The polymer is put into solution with an active solvent for the polymer. Examples of active solvents for polyvinylidene fluoride and polyvinyl chloride are dimethylacetamide, tetrahydrofuran, morpholine, benzaldehyde, cyclohexanone and the like. The solution should comprise from about 10 percent to about 30 percent by weight of total solids. Generally it is preferred to use a solution of about 20 percent by weight of the polymer with the remainder being a solvent such as dimethylacetamide.

The above solution is then combined with an acrylic monomer. The acrylic monomer is described in copending application Ser. No. 820,672 filed Apr. 30, 1969.

The acrylic monomer is one having the formula

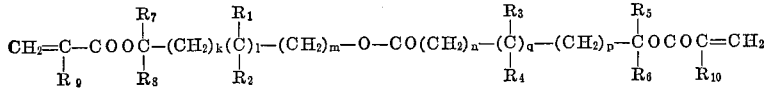

wherein R$_1$, R$_2$, R$_3$, and R$_4$ are selected from the group consisting essentially of H, alkyl, aryl, and cycloalkyl, substituted alkyl, substituted aryl and substituted cycloalkyl groups. The alkyl groups may be of any length but the preferred alkyl radicals contain from 1 to 8 carbon atoms such a methyl, ethyl, isopropyl, hexyl, octyl, and the like. The preferred cycloalkyl groups contain from 5 to 8 carbon atoms such as cyclopentyl, cyclohexyl, cycloheptyl and cyclooctyl. The preferred aryl groups contain up to 8 carbon atoms such as phenyl, benzyl, and the like. The alkyl, cycloalkyl and aryl radicals may also be substituted with halogens, hydroxyls, etc. Examples of these radicals are chloropropyl, bromobenzyl, chlorocyclopentyl, hydroxyethyl, chlorooctyl, chlorophenyl, bromophenyl, hydroxy phenyl, and the like.

The radicals R$_5$, R$_6$, R$_7$ and R$_8$ are selected from the group consisting of H, alkyl, aryl, and cycloalkyl. Examples of the alkyl, cycloalkyl, and aryl radicals which may apply are given above under the discussion of R$_1$, R$_2$, R$_3$, and R$_4$.

The radicals R$_9$ and R$_{10}$ are selected from the group consisting of H, alkyl groups containing from 1 to 2 carbon atoms, halo-substituted alkyl groups containing from 1 to 2 carbon atoms, and halogen. Examples are methyl, ethyl, bromoethyl, and chlorine.

It is noted that although R$_1$, R$_2$, R$_3$, R$_4$, R$_5$, R$_6$, R$_7$, R$_8$, R$_9$ and R$_{10}$ may be the same radicals, each one of them may be different from the other as long as they fall under the general definition for each. That is to say, that while R$_1$ and R$_2$ may be H, R$_3$ may be ethyl, R$_4$ may be pentyl, R$_5$ and R$_6$ may be cyclohexyl, etc.

$k$, $l$, $m$, $n$, $q$ and $p$ are whole numbers having values from 0 to 5.

The preferred novel compounds are those that contain the neopentyl type structures, for example, those wherein $R_1$, $R_2$, $R_3$ and $R_4$ are lower alkyl groups, such as methyl, ethyl and propyl, and $R_5$, $R_6$, $R_7$, and $R_8$ are H, and $p$ and $k$ are 0, $l$ and $q$ are 1, and $m$ and $n$ have values of 1 or 2. It has been found that these compounds exhibit the most durable and weather-ersistant properties.

The most preferable compound having this structure is acryloxypivalyl acryloxypivalate, in which $R_1$, $R_2$, $R_3$, $R_4$ are $CH_3$ radicals and $R_5$, $R_6$, $R_7$, $R_8$, $R_9$, and $R_{10}$ are H and $m$, $l$, and $q$ are 1 and $k$, $n$ and $p$ are 0.

Examples of other compounds having the above structures are methacryloxypivalyl methacryloxypivalate where $R_1$, $R_2$, $R_3$, $R_4$, $R_9$, and $R_{10}$ are $CH_3$ radicals and $R_5$, $R_6$, $R_7$, and $R_8$ are H and $l$, $m$, and $q$ are 1 and $k$, $n$ and $p$ are 0, 4-acryloxybutyl 4-acryloxybutyrate where $R_1$ to $R_{10}$ are H and $l$ and $q$ are 1, $k$ and $p$ are 2 and $m$ and $n$ are 0, acryloxypivalyl 4-acryloxybutyrate where $R_5$ to $R_{10}$ are H, $R_1$ and $R_2$ are $CH_3$. $k$ and $q$ are 0, $l$, $m$, and $p$ are 1 and $n$ is 2, 2-acryloxyethyl acryloxypivalate where $R_5$ to $R_{10}$ are H and $R_3$ and $R_4$ are $CH_3$. $k$ and $q$ are 1 and $l$, $m$, $n$, and $p$ are 0.

It is noted that mixtures of any two or more of the above compounds are also intended to be included by the above formula.

Methods of forming the acrylic monomers are described in copending application Ser. No. 820,672, filed Apr. 30, 1969.

The acrylic monomers may be mixed with the solution of the polymer in any manner.

The coating composition comprises from about 60 percent to about 95 percent by weight of the solution of polymer and from about 5 percent to about 40 percent by weight of the acrylic monomer. Normally only small amounts of the acrylic monomer need be added to the polymeric solution to achieve the desired composition. The preferred coating composition comprises 16 percent by weight of the acrylic monomer with the remainder being the polymeric solution.

The coating compositions may also include various plasticizers, fillers, additives, and the like. The coatings may be formed by applying the composition onto a substrate by any conventional coating means such as roller coating, curtain coating, brushing, spraying, etc.

The coating compositions may be applied to any substrate such as wood, metal, plastic, etc. The coating is then dried either by air drying or baking in an oven at low temperatures.

The novel coating compositions of this invention are highly sensitive to ionizing irradiation and the coatings can be cured to hard, stain-resistant, mar-resistant, and weather-resistant films by subjecting them to ionizing irradiation.

The term "irradiation," as used herein, means high energy radiation and/or the secondary energies resulting from conversion of electrons or other particle energy to X-rays or gamma radiation. While various types of irradiation are suitable for this purpose, such as X-ray and gamma rays, the radiation produced by accelerated high energy electrons has been found to be very conveniently and economically applicable and to give very satisfactory results. However, regardless of the type of radiation and the type of equipment used for its generation or application, the use thereof in the practice of the invention as described herein is contemplated as falling within the scope of this invention so long as the ionization radiation is equivalent to at least about 100,000 electron volts.

While there is no upper limit to the electron energy that can be so applied advantageously, the effects desired in the practice of this invention can be accomplished without having to go to above about 20,000,000 electron volts. Generally, the higher the electron energy used, the greater is the depth of penetration into the massive structure of the materials to be treated. For other types of radiation, such as gamma and X-rays, energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers. Van der Graaff generators, betatrons, synchrotrons, cyclotrons, etc. Neutron radiation can be produced by bombarding a selected light metal such as beryllium with positive particles of high energy. Particle radiation can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volt (mev.). In addition to irradiation of this type, commonly called X-ray, an ionizing electromagnetic irradiation suitable for the practice of this invention can be obtained by means of a nuclear reactor (pile) or by the use of natural or synthetic radioactive material, for example, cobalt 60.

Various types of high power electron linear accelerators are commercially available, for example, the ARCO type travelling wave accelerator, model Mark I, operating at 3 to 10 million electron volts, such as supplied by High Voltage Engineering Corporation, Burlington, Mass., or other types of accelerators as described in U.S. Pat. No. 2,763,609 and in British Pat. No. 762,953 are satisfactory for the practice of this invention.

The coatings will cure acceptably using any total dosage between about 0.2 megarad and about 50 megarads. A "rad" is defined as that amount of radiation required to supply 100 ergs per gram of material being treated and a "megarad" is $10^6$ rads. The total dosage is the total amount of irradiation received by the coating. The preferable total dosage used is from about 0.5 megarad to about 10 megarads.

The following examples set forth specific embodiments of the instant invention, however, the invention is not to be construed as being limited to these embodiments for there are, of course, numerous possible variations and modifications. All parts and percentages in the examples as well as throughout the specification are by weight unless otherwise indicated.

EXAMPLE I

A coating composition was formed by adding 10 parts of acryloxypivalyl acryloxypivalate to 50 parts of a 20 percent by weight solution of polyvinylidene fluoride (Kynar 500) in dimethylacetamide and mixing.

A glass substrate was coated with 3 mils of the above coating composition and air dried. The coating was then subjected to electron beam impingement at an accelerating potential of 400 kv. and a tube current of 14 milliamps. The coating received a total dosage of 5 megarads. The resulting coating was crosslinked and found to have excellent mar-resistance and stain-resistance.

The heat-resistance of the above composition was further tested by irradiating with a total dosage of 5 megarads to form a film and taping the film on an aluminum panel and inserting in an oven at 600° F. for a short time. The film was unaffected by the heat-resistance test. This was compared to a film formed from polyvinylidene fluoride without the acrylic monomer and irradiation, to the extent of 5 megarads, a film formed from polyvinylidene fluoride along with 5 megarads of irradiation, and the same composition of polyvinylidene fluoride and acrylic monomer without irradiation. The latter three films decomposed when inserted in the oven at 600° F. and melted and turned dark brown.

EXAMPLE II

A coating composition was formed by adding 15 parts of acryloxypivalyl acryloxypivalate to 25 parts of a 20 percent by weight solution of polyvinyl chloride (QYNV) in a 90 percent dimethylacetamide, 10 percent methyl ethyl ketone blend and mixing.

A glass substrate was coated with 3 mils of the above coating composition and air dried. The coating was then subjected to electron beam impingement at an accelerating potential of 400 kv. and a tube current of 14 milliamps. The coating received a total dosage of 5 megarads. The resulting coating was crosslinked and found to have excellent mar-resistance and stain-resistance.

The heat-resistance test of Example I was repeated with films of polyvinyl chloride and acrylic monomer as above which was irradiated with 5 megarads, films of polyvinyl chloride alone with and without irradiation, and a film of polyvinyl chloride and acrylic monomer without irradiation. The latter three films were decom-

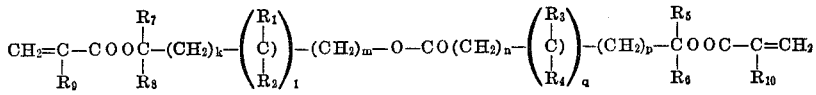

posed by the treatment while the film formed from the method of this invention remained unaffected by the treatment.

According to the provisions of the patent statutes, there is described above the invention and what are now considered to be its best embodiments. However, within the scope of the appended claims, it is to be understood that the invention can be practiced otherwise than as specifically described.

I claim:

1. A coating composition comprising
(a) a solution of a polymer of polyvinyl chloride or polyvinylidene fluoride in a solvent for said polymer and
(b) a compound having the general formula

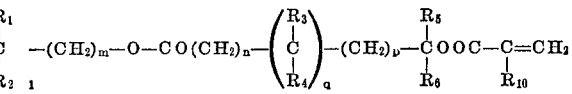

wherein
$R_1$, $R_2$, $R_3$, and $R_4$ are selected from the group consisting of H, alkyl, aryl, cycloalkyl, substituted alkyl, substituted aryl and substituted cycloalkyl groups,
$R_5$, $R_6$, $R_7$ and $R_8$ are selected from the group consisting of H, alkyl, aryl, and cycloalkyl groups.
$R_9$ and $R_{10}$ are selected from the groups consisting of H, alkyl groups containing from 1 to 2 carbon atoms, halo-substituted alkyl groups containing from 1 to 2 carbon atoms and halogen, and
$k$, $l$, $m$, $n$, $p$ and $q$ are numerals having values from 0 to 5.

2. The coating composition of claim 1 wherein the polymer is polyvinyl chloride.

3. The coating composition of claim 1 wherein the polymer is polyvinylidene fluoride.

4. The coating composition of claim 1 wherein the solvent is tetrahydrofuran.

5. The coating composition of claim 1 wherein the solvent is dimethylacetamide.

6. The coating composition of claim 1 wherein compound (b) is acryloxypivalyl acryloxypivalate.

7. The coating composition of claim 1 wherein the solution comprises from about 10 percent to about 30 percent by weight of the polymer.

8. The coating composition of claim 7 wherein the composition comprises from about 60 percent to about 95 percent by weight of the solution (a) and from about 5 percent to about 40 percent by weight of compound (b).

9. The method of coating a substrate comprising applying to the substrate the coating composition of claim 1 allowing the coating to dry, and subjecting the coating to ionizing irrariation to cure said coating.

10. The method of claim 9 wherein the total dose of ionizing irradiation is from about 0.2 megarad to about 50 megarads.

11. The method of claim 9 wherein the substrate is wood.

12. The method of claim 9 wherein the substrate is steel.

13. The method of claim 9 wherein the substrate is aluminum.

14. The method of claim 9 wherein the polymer is polyvinyl chloride.

15. The method of claim 9 wherein the polymer is polyvinylidene fluoride.

16. A coated substrate comprising a substrate coated with a film comprising (a) a polymer of polyvinyl chloride or polyvinylidene fluoride and (b) a compound having the formula

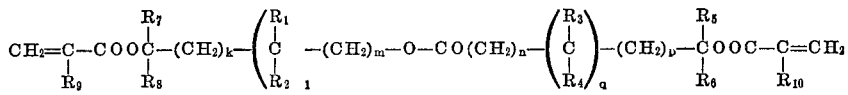

wherein
$R_1$, $R_2$, $R_3$ and $R_4$ are selected from the group consisting of H, alkyl, aryl, cycloalkyl, substituted alkyl, substituted cycloalkyl groups,
$R_5$, $R_6$, $R_7$ and $R_8$ are selected from the group consisting of H, alkyl, aryl, and cycloalkyl groups,
$R_9$ and $R_{10}$ are selected from the groups consisting of H, alkyl groups containing from 1 to 2 carbon atoms, halo-substituted alkyl groups containing from 1 to 2 carbon atoms and halogen, and
$k$, $l$, $m$, $n$, $p$ and $q$ are numerals having values from 0 to 5.

17. The coated substrate of claim 16 wherein the polymer is polyvinyl chloride.

18. The coated substrate of claim 16 wherein the polymer is polyvinylidene fluoride.

19. The coated substrate of claim 16 wherein compound (b) is acryloxypivalyl acryloxypivalate.

20. The coated substrate of claim 16 wherein the substrate is wood.

21. The coated substrate of claim 16 wherein the substrate is steel.

22. The coated substrate of claim 16 wherein the substrate is aluminum.

References Cited

UNITED STATES PATENTS 3,359,193  12/1967  Pinner _____ 204—159.17
3,542,661  11/1970  Klopfer et al. _____ 204—159.17

ALFRED L. LEAVITT, Primary Examiner

J. H. NEWSOME, Assistant Examiner

U.S. Cl. X.R.

117—132 B, 148, 124 E, 161 UC, 161 UZ; 204—159.17; 260—32.8 R, 32.6 R, 30.4 R, 884, 78.5 B, 78.5 CL, 78.4 R, 78.4 E